(12) United States Patent
Mead et al.

(10) Patent No.: US 10,148,678 B2
(45) Date of Patent: Dec. 4, 2018

(54) CYBERSECURITY SYSTEM WITH DIFFERENTIATED CAPACITY TO DEAL WITH COMPLEX CYBER ATTACKS

(71) Applicant: The Boeing Company, Chicago, IL (US)

(72) Inventors: Jadranka Mead, Renton, WA (US); James E. Vasatka, Monroe, WA (US); John A. Craig, Snohomish, WA (US)

(73) Assignee: THE BOEING COMPANY, Chicago, IL (US)

( * ) Notice: Subject to any disclaimer, the term of this patent is extended or adjusted under 35 U.S.C. 154(b) by 1 day.

(21) Appl. No.: 14/872,698

(22) Filed: Oct. 1, 2015

(65) Prior Publication Data
US 2017/0099308 A1  Apr. 6, 2017

(51) Int. Cl.
*H04L 29/06* (2006.01)
*G06F 21/57* (2013.01)
*G06N 7/00* (2006.01)

(52) U.S. Cl.
CPC ........ *H04L 63/1425* (2013.01); *G06F 21/577* (2013.01); *G06N 7/005* (2013.01); *H04L 63/1433* (2013.01); *H04L 63/168* (2013.01); *H04L 63/20* (2013.01)

(58) Field of Classification Search
CPC ............. H04L 63/1425; H04L 63/1416; H04L 63/1441; H04L 63/1433; H04L 43/00; H04L 43/028; H04L 43/08; G06F 21/552; G06F 21/566; G06F 21/55; G06F 21/554; G06F 21/56; G06F 21/316; G06F 21/562; G06F 21/563; G06F 21/564; G06F 21/561; G06F 21/567
See application file for complete search history.

(56) References Cited

U.S. PATENT DOCUMENTS

| | | | | |
|---|---|---|---|---|
| 7,634,262 B1* | 12/2009 | Li | ............ | H04L 51/12 370/235 |
| 2003/0110396 A1* | 6/2003 | Lewis | ................ | H04L 63/0227 726/4 |
| 2009/0030045 A1 | 1/2009 | Song et al. | | |
| 2009/0064323 A1* | 3/2009 | Lin | ........... | H04L 51/12 726/22 |
| 2009/0126023 A1 | 5/2009 | Yun et al. | | |
| 2009/0144827 A1* | 6/2009 | Peinado | ................ | G06F 21/577 726/25 |

(Continued)

OTHER PUBLICATIONS

European Search Report dated Feb. 20, 2017 in corresponding European Patent Application No. 16185788.3.

*Primary Examiner* — Tae K Kim
(74) *Attorney, Agent, or Firm* — MH2 Technology Law Group LLP

(57) ABSTRACT

An improved cyber security protection system with differentiated capacity to deal with complex cyber attacks in complex, highly-connected industries. The system architecture is goal-oriented and separates security goals and concerns by layers that are assigned specific functions to address only those goals. The functions operate concurrently within the layers and provide insight on their respective layers. The layers are interconnected with connection modules using bi-directional interfacing to establish a feedback look within the entire system. Complex adaptive systems (CAS) algorithms are used to identify the probably threats to the system.

10 Claims, 4 Drawing Sheets

(56) References Cited

U.S. PATENT DOCUMENTS

| | | | |
|---|---|---|---|
| 2010/0082513 A1* | 4/2010 | Liu | H04L 63/1458 706/46 |
| 2010/0138378 A1* | 6/2010 | Jannarone | G06N 3/08 706/52 |
| 2012/0144492 A1* | 6/2012 | Griffin | G06F 21/56 726/25 |
| 2012/0180126 A1* | 7/2012 | Liu | G06F 11/3013 726/22 |
| 2012/0233656 A1* | 9/2012 | Rieschick | H04L 63/1441 726/1 |
| 2012/0304007 A1* | 11/2012 | Hanks | H04L 67/12 714/26 |
| 2013/0145465 A1* | 6/2013 | Wang | G06F 21/552 726/23 |
| 2014/0283048 A1* | 9/2014 | Howes | G06F 17/30864 726/23 |
| 2014/0337974 A1* | 11/2014 | Joshi | H04L 63/1425 726/23 |
| 2015/0101047 A1* | 4/2015 | Sridhara | G06F 21/55 726/23 |
| 2015/0326600 A1* | 11/2015 | Karabatis | H04L 63/1433 726/25 |
| 2015/0373036 A1* | 12/2015 | Patne | H04L 63/1416 726/23 |
| 2016/0078347 A1* | 3/2016 | Salajegheh | G06N 5/04 706/12 |
| 2016/0078365 A1* | 3/2016 | Baumard | G06F 21/552 706/12 |
| 2016/0094565 A1* | 3/2016 | Adams | H04L 63/1416 726/24 |
| 2016/0232358 A1* | 8/2016 | Grieco | G06F 21/577 |

\* cited by examiner

CYBERSECURITY SYSTEM WITH DIFFERENTIATED CAPACITY TO DEAL WITH COMPLEX CYBER ATTACKS

TECHNOLOGICAL FIELD

The present disclosure relates generally to cybersecurity systems and, in particular, to an improved cybersecurity system including a goal-oriented architecture design to target complex threats in highly connected industries, such as the aviation industry.

BACKGROUND

The aviation industry largely depends on the reliable functioning of critical information technology infrastructure. Like many other industries, the aviation industry is challenged with providing adequate security for such IT infrastructure and mitigating the effects of any cyber events. Examples of cyber events include malicious or suspicious events that compromise, or attempt to compromise, the operation of an aircraft's network, including its data connections, data transmission, and computing systems.

Currently available cyber security systems are relatively well equipped to deal with cyber attacks which are one dimensional. These involve one type of attack vector, such as malware, executed on one company's system to extract data from that system. However, complex cyber threats involve several simultaneous attack vectors, and often compromise loosely related systems to deliver the intended damage to one of them (the real target). For instance, a money theft schema could involve phishing to gain access to a bank analyst, exfiltration software to gain access to ATM cash order processes within the bank, spyware to capture keyboard strokes inside a different ATM cash authorizing entity, and access to physical ATM cash delivery machines on a different continent. Thus, complex attack vectors can consist of two or more means and two or more paths all executing at the same time across different companies, geographies and types of assets.

Existing cyber security systems are generally designed in one of two manners: (1) threats are identified and available cyber security tools ("COTS") are purchased and deployed with an expectation to mitigate the identified threats; or (2) a selection of best current COTS is purchased and deployed with an expectation to do the best job possible in protecting the enterprise. A significant limitation of such existing cyber security tools is that they have visibility and specialize only in the types of domains, events and threats they monitor and report on. As a consequence, the architectures for these tools are necessarily contained within the domain monitored and consequently only detect and report on attack vectors within that specific company or type of asset or threat. Complex attack vectors, which have cross-domain, cross-industry and cross-asset attack vector paths are not part of such cyber security detection methods cyber security tools.

Thus, it is desirable to have an improved system and method for detecting and dealing with complex cyber attacks.

BRIEF SUMMARY

In view of the foregoing background, example implementations of the present disclosure provide a cyber security system including a sublayer that monitors and tracks cybersecurity data for forensic analysis, an overlayer that monitors, tracks, and measures cybersecurity data across a plurality of cyber environments, and a CAS algorithm that is used to learn, predict, and take action based on the cybersecurity data. The overlayer and the sublayer exchange cybersecurity data. Each of the sublayer and overlayer further include functions that operate within the sublayer and overlayer. Also, the sublayer and overlayer exchange the cybersecurity data via a bi-directional connection module and the exchanged cybersecurity data is correlated. The connection module facilitates a feedback loop throughout the system and the cyber security system further includes a complex adaptive system (CAS) algorithm that predicts cyber attacks and based on the cybersecurity data. The CAS algorithm is modified to create state machines representing the cyber security system, run the state machines and record their transitions, associate probabilities with the transitions, predict outcomes based on the probabilities, determine if action needs to be taken, and take action if a level of probability is over a predetermined threshold.

The features, functions and advantages discussed herein may be achieved independently in various example implementations or may be combined in yet other example implementations, further details of which may be seen with reference to the following description and drawings.

BRIEF DESCRIPTION OF THE DRAWING(S)

Having thus described example implementations of the disclosure in general terms, reference will now be made to the accompanying drawings, which are not necessarily drawn to scale, and wherein:

DETAILED DESCRIPTION

Figure 1:
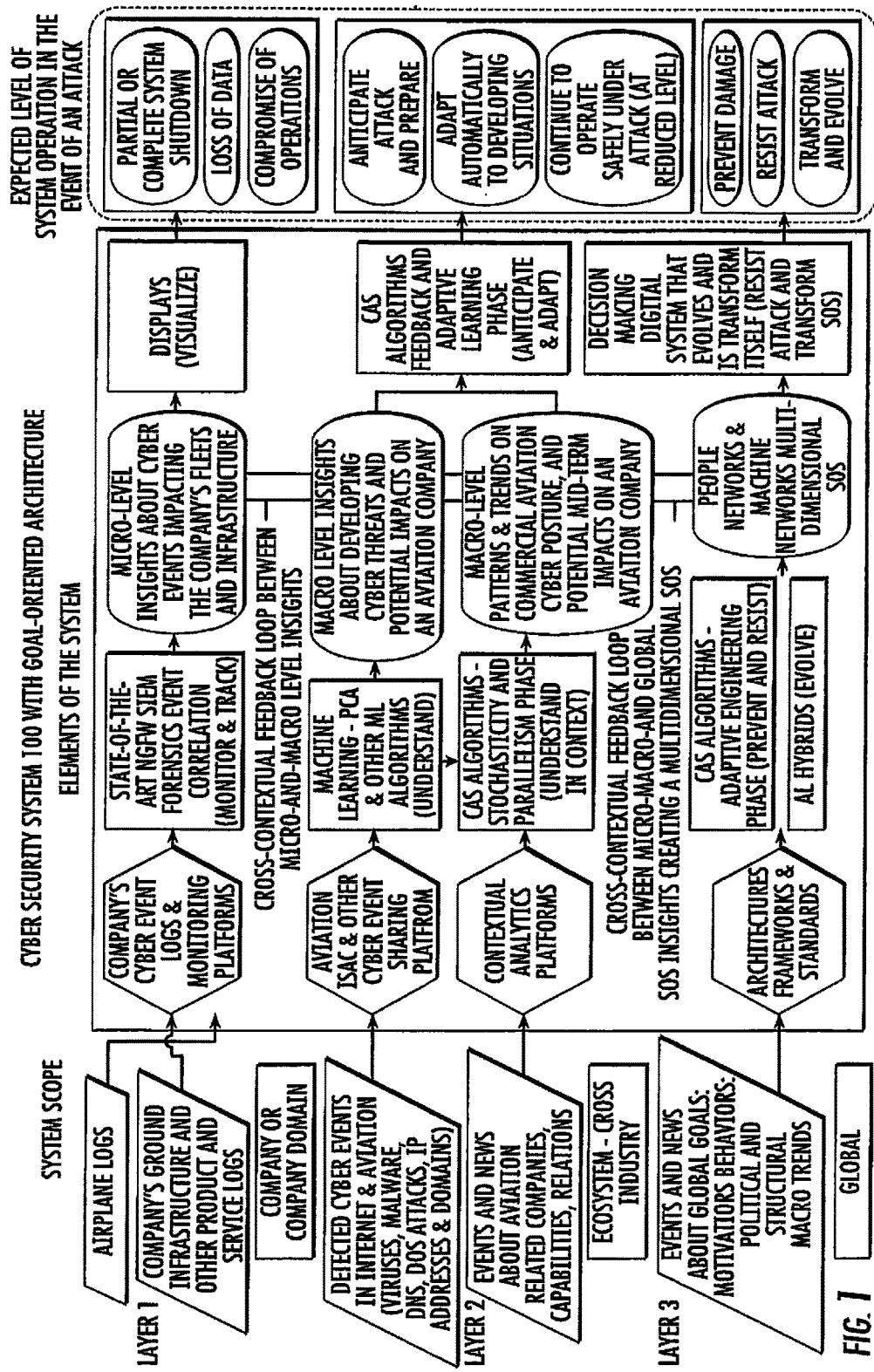
FIG. 1 is logic diagram of a cyber security system with a goal-oriented architecture to deal with complex cyber attacks in accordance with an example implementation of the present disclosure.

Some implementations of the present disclosure will now be described more fully hereinafter with reference to the accompanying drawings, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, unless otherwise indicated, reference something as being a first, second or the like should not be construed to imply a particular order. Also, something may be described as being above something else (unless otherwise indicated) may instead be below, and vice versa; and similarly, something described as being to the left of something else may instead be to the right, and vice versa. Like reference numerals refer to like elements throughout.

Example implementations of the present disclosure will be primarily described in conjunction with aviation applications. It should be understood, however, that example implementations may be utilized in conjunction with a variety of other applications, both in the aviation industry and outside of the aviation industry.

Commercial aviation is a complex system with many actors in terms of product and service providers, their partners, suppliers, customers, and global facilities. All such actors are very tightly interconnected in terms of information exchange. Many actors in this interconnected network are allowed access into each other's internal networks as a business requirement. This feature of the commercial aviation ecosystem potentially allows for the establishment of a very long path of an attack vector through this complex system.

The present disclosure is for an improved cybersecurity system with differentiated capacity to deal with complex cyber attacks. As explained in more detail below, the system is based on a goal-oriented cybersecurity design that identifies and separates the goals and concerns by layers. Layers are assigned specific functions that address the goals of the system. The functions operate concurrently within the layers and deliver insights relevant to that layer of concern. The layers are interconnected via specific connection modules at intentionally designed interfaces. The connection modules exchange insights in a bidirectional manner and implement a feedback loop within the entire system. The connection modules are integral components of the system when used in highly connected industries, such as aviation. Such connection modules facilitate tracking, discovery, and isolation of complex attack vector paths for such complex and cross-functional industries.

Goal oriented design.

As a result of the system design being goal-oriented, all actors in the design expect the same outcome from the system without any false expectations. Particularly, both the business and technical community are able to understand the abilities and the limitations of decisions related to the system design. This design allows the operational, process, staffing and governance communities (e.g. legal and audit) to align with the technical cyber security architecture design and provide their own artifacts and capabilities that are aligned with each other and the technical goals. As an example, if a cyber security design team targets a second level, "Manage' cyber security, then the operational community has an opportunity to target installation of operating systems that are heterogeneous to target the same level.

Goals and concerns are separated by layers.

Design layers are especially significant for the cyber system industry, which is evolving at fast pace. By separating out the goals and concerns of the system by layers, the system of the present disclosure has the ability to evolve and/or replace a very distinct set of related capabilities while leaving others capabilities intact. Particularly, the design layers are separated into subsystems in the overall system design such that they are at very different levels of maturity, and require different techniques and/or types of personnel to implement them. Design layers may also be governed by different corporate governance bodies, policies, and regulatory requirements.

The functions are grouped to allow for concurrent operation within layers. Because the functions are grouped by their semantic meanings, algorithms may be run at the same frequency (or continuously) within the layers. For example, when looking across the layers, running an algorithm to generate a hierarchical cluster out of a large set of social feed-based news may operate at a very different frequency level in one layer versus collection of network data at a more important layer, which occurs in real time. This feature allows the subsystems to derive insights at the fastest pace possible, without slower subsystems delaying the progress of the faster subsystems within the same layer.

Layers exchange information via connection modules.

The connection modules are designed to alleviate a common shortcoming of prior art cyber security systems that deliver computations at varying levels of granularity. For instance, in such prior art systems, network packet level visibility could be delivered at the same time as geographic social news feed visibility; however, because each is delivered to different organization entities and with different visual interfaces, it is impossible to know the significance or the interconnection between them, if any. The connection modules of the present system, however, are designed to deliver such interconnection insights and allow analysis of these interconnections, continuously and purposefully.

The bidirectional nature of interfaces.

Prior art cyber security systems have, at best, one-to-one interfaces between some of the systems and there is no feedback loop across the entire system. This is a significant shortcoming when it comes to detecting and isolating complex cyber threats in complex industries with potentially very long attack paths. The improved cyber security system of the present disclosure facilitates a circular flow of information within the entire system. This flow is implemented via the connection modules referenced above. The bidirectional flow is an improvement over prior art systems that only elevated cyber attack information under the assumption that the information only needs to move "up" through the system. The bidirectional nature of the connection modules in the present system implements the philosophy that a user of a feature knows best how to use it, and also allows for maximum visibility within the system. This leads to increased awareness and, thus, increased capability of the overall system to protect itself from complex attacks. The particular combination of the connection modules and bidirectional interfaces facilitates the detection and isolation of complex cyber attack vectors in highly interconnected industries.

Today, cyber security systems are loosely referred to as reactive or proactive, depending on what types of tools are included into a specific system. In the example shown in FIG. 1 of a cyber security system 100 in accordance with an implementation of the present disclosure, a three (horizontal) layer system incorporating multiple subsystems with differentiated capacity is used to deal with complex cyber attacks in a highly interconnected industry. The layers are reactive (Layer 1), anticipatory (Layer 2), and resilient (Layer 3). The block entitled "Elements of the System" lists the functions included in each layer for the goals and effects of the system as 100 listed in the far right block entitled "Expected Level of System Operation In The Event Of An Attack."

The first subsystem includes inputs from the company managing the system 100, cross-industry ecosystem, and global categories, as shown on the left side of the Figure. The second subsystem includes the platforms and algorithms, with associated inputs and outputs, to achieve the desired capacity to deal with a cyber attack. This is illustrated by the box in the center of the Figure. The third subsystem includes the connection modules that bridge the three horizontal layers of the design and operate concurrently as a background process to all of the layers of the system 100. The connection modules and corresponding bidirectional interfaces are depicted as parallel lines between the layers.

The system 100 architecture as depicted in FIG. 1 illuminates why it is not sufficient for the connection modules to be unidirectional and why it is important that the connection modules be designed as feedback loops. Without the use of feedback loops, the system cannot "feed" potential events from the micro layer (e.g., Layer 1 in the Figure), into the knowledge base of the macro layer (Layer 2) in order to discover hidden connections and insights. Similarly, the macro layer (Layer 2), upon discovery of an interesting macro pattern, may inform the correlation/data mining engine at the micro layer (Layer 1) to do additional work. The same applies to all the layers of the system 100.

In one implementation of the present disclosure, modified complex adaptive systems (CAS) algorithms are used to analyze and feed information from the system 100 to a machine learning module that is part of the feedback loop referenced above. The CAS algorithm models, measures, and predicts the probability of certain actions within the system 100 and intervenes if the probability of an action is outside some predetermined bounds.

Figure 2:
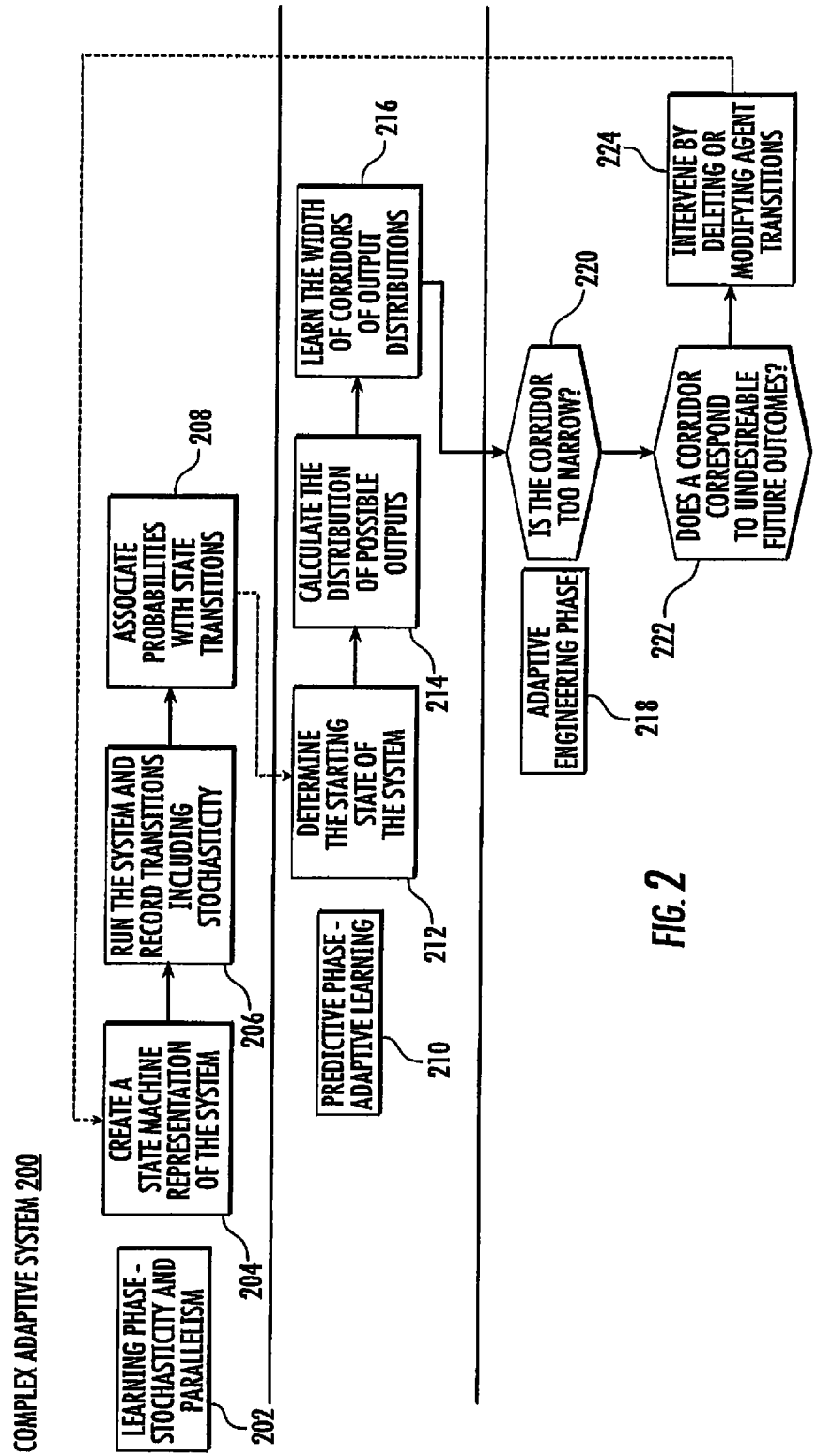
FIG. 2 is a flowchart of use of complex adaptive system algorithms and agent-based modeling in accordance with an example implementation of the present disclosure.

FIG. 2 depicts an example of use of CAS 200 algorithms and agent-based modeling in a commercial aviation cyber security setting. In the learning phase (202), a state machine representative of the system 100 is created (204), the state machine is run and transitions are recorded including stochasiticity (206), and probabilities are associated with the state transitions (208). In the predictive phase (210), the starting state of the state machine system is determined (212), the distribution of possible outputs is calculated (214), and the width of the corridors of output distributors are learned (216). Then in the adaptive engineering phase (218), which refers to agents in the state machine system (such as software and hardware components), an assessment is made of whether the corridor is too narrow (220) and whether the corridor corresponds to undesirable future outcomes (222). If so, there is intervention by deleting or modifying such agent transitions (224).

One possible implementation of the goal-oriented cyber security system 100 of the present disclosure in the commercial aviation industry would include:
  Contextual analytics of the commercial aviation supply chain in the cyber event space;
  Machine learning using Principal Component Analysis (PCA) for identifying the most significant combinations of aviation ecosystem features;
  Agent based modeling algorithms for Complex Adaptive Systems (as described above with respect to FIG. 2), to identify the most probable developing threat regions based on recent histories of different ecosystem partners in the (aviation) ecosystem; and
  Correlation analysis of the interconnected modules, including correlation of cyber events within the company, ecosystem cyber events, and global news.

Referring again to FIG. 1, today's complex cyber environment requires an integrated system 100 as described above, which requires parallel operation of all the layers of the design in order to detect and isolate complex attack vector paths. The connection modules integrate the cyber protection system at the level of processed information, thereby leveraging the work already spent at each layer of the system 100.

By implementing a separation of the architectural goals and concerns at the very beginning of the design, the cyber security system 100 of the present disclosure is able to (1) process data with most appropriate tools for each data type and desired outcome, (2) perform the computations in parallel, and (3) leverage the findings at the latest computational stage thereby further speeding up the process. Thus, the differentiated workflow process drives the selection of inputs, tools and other services that may even be external to the cyber security system (e.g., operational or infrastructure decisions). Global dimensions and influences on cybersecurity postures are accounted for in the system 100 in order to mitigate culturally, politically and similarly driven attacks. Also, new design modules can be identified that are needed to deal with complex cyber attacks and long attack vector paths that cross multiple industries and other domains. Because of the concurrency, background operations and required feedback loops, the timing of operations is optimized and delay points are eliminated. The circular workflow and information base build-outs are implemented via the feedback-loops of the connection modules to speed up time and the attack discovery horizon. Finally, the layered model accounts for an easy evolution and allows for pivoting and disruption, as needed.

According to example implementations of the present disclosure, the various components of the cyber security system with differentiated capacity to deal with complex cyber attacks may be implemented by various means including hardware, alone or under direction of one or more computer program code instructions, program instructions or executable computer-readable program code instructions from a computer-readable storage medium.

In one example, one or more apparatuses may be provided that are configured to function as or otherwise implement the cyber security system with differentiated capacity to deal with complex cyber attacks and respective elements shown and described herein. In examples involving more than one apparatus, the respective apparatuses may be connected to or otherwise in communication with one another in a number of different manners, such as directly or indirectly via a wireline or wireless network or the like.

Generally, an apparatus of exemplary implementation for the system 100 of the present disclosure may include one or more of a number of components such as a processor (e.g., processor unit) connected to a memory (e.g., storage device), as described above. The processor is generally any piece of hardware that is capable of processing information such as, for example, data, computer-readable program code, instructions or the like (generally "computer programs," e.g., software, firmware, etc.), and/or other suitable electronic information. More particularly, for example, the processor may be configured to execute computer programs, which may be stored onboard the processor or otherwise stored in the memory (of the same or another apparatus). The processor may be a number of processors, a multi-processor core or some other type of processor, depending on the particular implementation. Further, the processor may be implemented using a number of heterogeneous processor systems in which a main processor is present with one or more secondary processors on a single chip. As another illustrative example, the processor may be a symmetric multi-processor system containing multiple processors of the same type. In yet another example, the processor may be embodied as or otherwise include one or more application-specific integrated circuits (ASICs), field-programmable gate arrays (FPGAs) or the like. Thus, although the processor may be capable of executing a computer program to perform one or more functions, the processor of various examples may be capable of performing one or more functions without the aid of a computer program.

The memory is generally any piece of hardware that is capable of storing information such as, for example, data, computer programs and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk-read only memory (CD-ROM), compact disk-read/write (CD-R/W), DVD or the like. In various instances, the memory may be referred to as a computer-readable storage medium which, as a non-transitory device capable of storing information, may be distinguishable from computer-readable transmission media such as electronic transitory signals capable of carrying information from one location to another. Computer-readable medium as described herein may generally refer to a computer-readable storage medium or computer-readable transmission medium.

In addition to the memory, the processor may also be connected to one or more interfaces for displaying, transmitting and/or receiving information. The interfaces may include a communications interface (e.g., communications unit) and/or one or more user interfaces. The communications interface may be configured to transmit and/or receive information, such as to and/or from other apparatus(es), network(s) or the like. The communications interface may be configured to transmit and/or receive information by physical (wireline) and/or wireless communications links. Examples of suitable communication interfaces include a network interface controller (NIC), wireless NIC (WNIC) or the like.

The user interfaces may include a display and/or one or more user input interfaces (e.g., input/output unit). The display may be configured to present or otherwise display information to a user, suitable examples of which include a liquid crystal display (LCD), light-emitting diode display (LED), plasma display panel (PDP) or the like. The user input interfaces may be wireline or wireless, and may be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces may further include one or more interfaces for communicating with peripherals such as printers, scanners or the like.

Program code instructions may be stored in memory, and executed by a processor, to implement functions of the cyber security system with differentiated capacity to deal with complex cyber attacks. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processor or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processor or other programmable apparatus to configure the computer, processor or other programmable apparatus to execute operations to be performed on or by the computer, processor or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processor or other programmable apparatus provide operations for implementing functions described herein.

Execution of instructions by a processor, or storage of instructions in a computer-readable storage medium, supports combinations of operations for performing the specified functions. It will also be understood that one or more functions, and combinations of functions, may be implemented by special purpose hardware-based computer systems and/or processors which perform the specified functions, or combinations of special purpose hardware and program code instructions.

Figure 3:
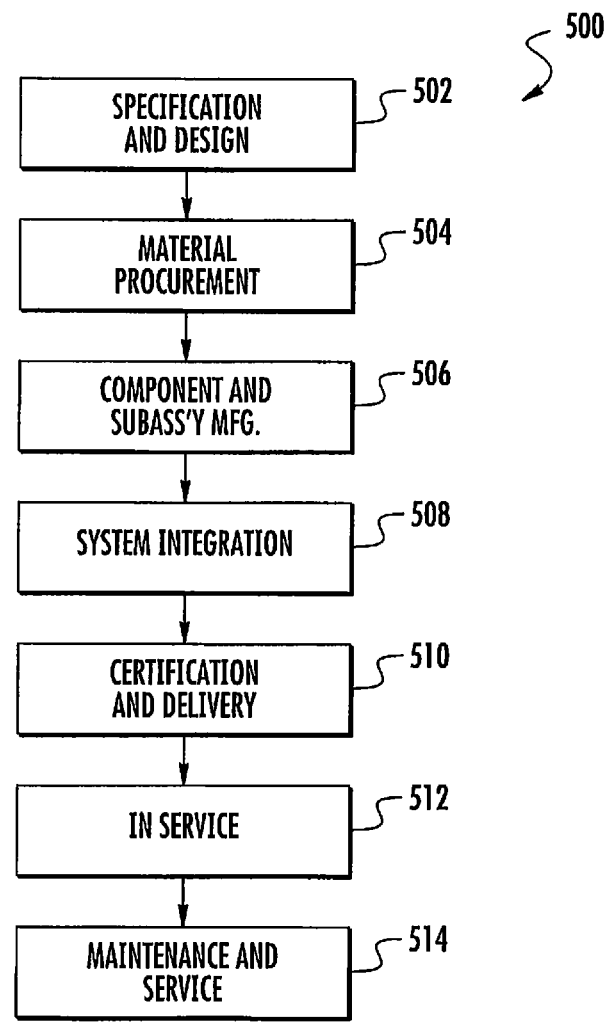
FIG. 3 is a block diagram of aircraft production and service methodology.
Figure 4:
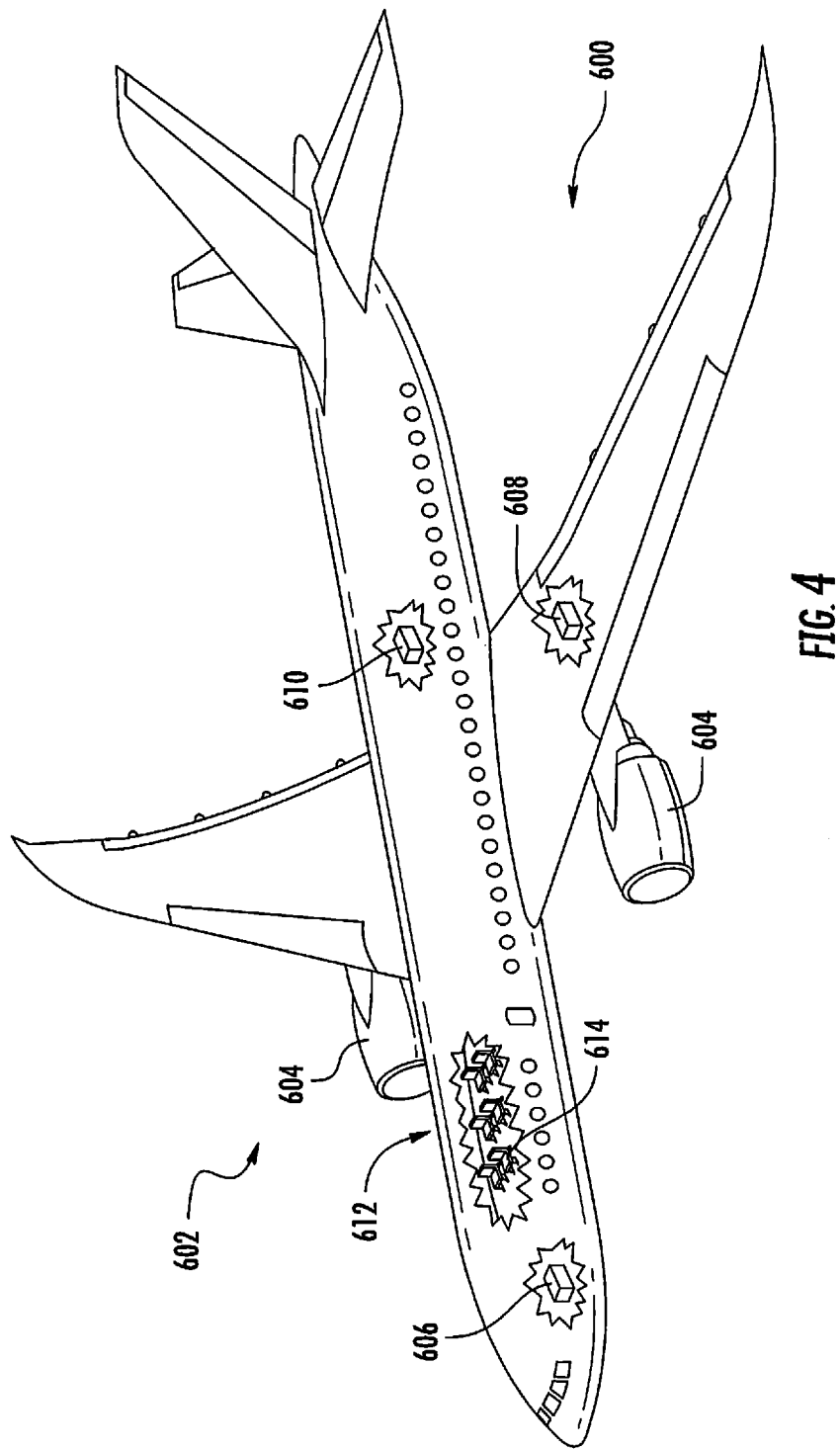
FIG. 4 is a schematic illustration of an aircraft.

As referenced above, examples of the present disclosure may be described in the context of aircraft manufacturing and service. As shown in FIGS. 3 and 4, during pre-production, illustrative method 500 may include specification and design (block 502) of aircraft 602 and material procurement (block 504). During production, component and subassembly manufacturing (block 506) and system integration (block 508) of aircraft 602 may take place. Thereafter, aircraft 602 may go through certification and delivery (block 510) to be placed in service (block 512). While in service, aircraft 602 may be scheduled for routine maintenance and service (block 514). Routine maintenance and service may include modification, reconfiguration, refurbishment, etc. of one or more systems of aircraft 602.

Each of the processes of illustrative method 500 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 4, aircraft 602 produced by illustrative method 500 may include airframe 612 with a plurality of high-level systems 600 and interior 614. Examples of high-level systems 600 include one or more of propulsion system 604, electrical system 606, hydraulic system 608, and environmental system 610. Any number of other systems may be included. Although an aerospace example is shown, the principles disclosed herein may be applied to other industries, such as the automotive industry. Accordingly, in addition to aircraft 602, the principles disclosed herein may apply to other vehicles, e.g., land vehicles, marine vehicles, space vehicles, etc.

Apparatus(es) and method(s) shown or described herein may be employed during any one or more of the stages of the manufacturing and service method 500. For example, components or subassemblies corresponding to component and subassembly manufacturing 506 may be fabricated or manufactured in a manner similar to components or subassemblies produced while aircraft 602 is in service. Also, one or more examples of the apparatus(es), method(s), or combination thereof may be utilized during production stages 506 and 508, for example, by substantially expediting assembly of or reducing the cost of aircraft 602. Similarly, one or more examples of the apparatus or method realizations, or a combination thereof, may be utilized, for example and without limitation, while aircraft 602 is in service, e.g., maintenance and service stage (block 1116).

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus(es) and method(s) disclosed herein in any combination, and all of such possibilities are intended to be within the spirit and scope of the present disclosure.

Many modifications and other implementations of the disclosure set forth herein will come to mind to one skilled in the art to which this disclosure pertains having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Moreover, although the foregoing descriptions and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An aviation cyber security system comprising:
    a reactive sublayer that monitors and tracks cybersecurity sublayer data for forensic analysis, the cybersecurity sublayer data comprising data from across an aviation ecosystem that is selected from the group consisting of viruses, malware, domain name servers (DNS), denial of service (DOS) attacks, and Internet Protocol (IP) addresses and domains;
    a resilient overlayer that monitors, tracks, and measures cybersecurity overlayer data across a plurality of cyber environments comprising an aviation cyber environment, the cybersecurity overlayer data comprising events and news data relating to the cyber security system's global goals, wherein the overlayer is disjoint from the sublayer;
    an anticipatory layer that monitors and tracks cybersecurity anticipatory layer data generated from an industry ecosystem for analysis, the anticipatory layer data being selected from the group consisting of viruses, malware, domain name servers (DNS), denial of service (DOS) attacks, and Internet Protocol (IP) addresses and domains, wherein the anticipatory layer is disjoint from the overlayer and from the reactive sublayer;
    a complex adaptive system (CAS) algorithm that is used to learn, predict, and take action based on the cybersecurity sublayer data, the cybersecurity overlayer data, and the cybersecurity anticipatory layer data, to feed information to a machine learning module, and to identify probable developing threat regions based at least in part of the cybersecurity overlayer data; and
    at least one bi-directional connection module that facilitates a feedback loop throughout the system, wherein the feedback loop comprises the machine learning module, wherein the overlayer and the sublayer exchange cybersecurity data via the at least one bi-directional connection module, and the exchanged cybersecurity data is correlated.

2. The cyber security system of claim 1 wherein each of the sublayer and overlayer further comprise functions that operate within the sublayer and overlayer.

3. The cyber security system of claim 1 wherein the CAS algorithm is modified to: create state machines representing the cyber security system; run the state machines and record their transitions; associate probabilities with the transitions; predict outcomes based on the probabilities; determine if action needs to be taken; and take action if a level of probability is over predetermined threshold.

4. The cyber security system of claim 1 wherein the cybersecurity overlayer data includes data selected from the group consisting of motivational behaviors and political and structural macro trends.

5. An aviation cybersecurity system having at least one cybersecurity goal of predicting complex threats, the cybersecurity system comprising:
    a first layer that addresses the cybersecurity goal by monitoring and tracking cybersecurity first layer data generated from inputs managed by an aviation entity managing the cybersecurity system, wherein the first layer is reactive;
    a second layer that addresses the cybersecurity goal by monitoring and tracking cybersecurity second layer data generated from an industry ecosystem for analysis, the second layer data being selected from the group consisting of viruses, malware, domain name servers (DNS), denial of service (DOS) attacks, and Internet Protocol (IP) addresses and domains, wherein the second layer is anticipatory and disjoint from the first layer;
    a third layer that addresses the cybersecurity goal by monitoring, tracking, and measuring cybersecurity third layer data across a plurality of cyber environments comprising an aviation cyber environment, the third layer data comprising events and news data relating to the cybersecurity goal from a global perspective, wherein the third layer is resilient and disjoint from the first layer and the second layer; and
    a complex adaptive system (CAS) algorithm that is used to learn, predict, and take action based on the first layer data, second layer data, and third layer data, to feed information to a machine learning module, and to identify probable developing threat regions based at least in part of the cybersecurity third layer data; and
    at least one bi-directional connection module that facilitates a feedback loop throughout the system, wherein the feedback loop comprises the machine learning module, wherein the first layer, second layer, and third layer exchange cybersecurity data after the cybersecurity data has been processed within the respective layers via the at least one bi-directional connection module, and the exchanged cybersecurity data is correlated.

6. The cybersecurity system of claim 5 wherein each of the first layer, second layer, and third layer comprises functions that operate concurrently within the respective layers to deliver insights relevant to the respective layers regarding the cybersecurity goal.

7. The cybersecurity system of claim 5 wherein the first layer, second layer, and third layer perform calculations in parallel.

8. The cybersecurity system of claim 5 wherein if any one of the first layer, second layer, or third layer is disrupted, the remaining layers continue to monitor and track cybersecurity data within their respective layers regarding the cybersecurity goal.

9. The cybersecurity system of claim 5 wherein the CAS algorithm is modified to:
- create state machines representing the cybersecurity system;
- run the state machines and record their transitions;
- associate probabilities with the transitions;
- predict outcomes based on the probabilities;
- determine if action needs to be taken; and
- take action if a level of probability is over predetermined threshold.

10. The cybersecurity system of claim 5 wherein the cybersecurity third layer data includes data selected from the group consisting of motivational behaviors and political and structural macro trends.

* * * * *